No. 844,186. PATENTED FEB. 12, 1907.
P. F. PÜTZ.
TELESCOPE WITH PRISMS.
APPLICATION FILED OCT. 15, 1906.

2 SHEETS—SHEET 1.

Witnesses  Inventor
  Peter F. Pütz
by William F. Hall
his atty.

No. 844,186. PATENTED FEB. 12, 1907.
P. F. PÜTZ.
TELESCOPE WITH PRISMS.
APPLICATION FILED OCT. 15, 1906.

2 SHEETS—SHEET 2.

Witnesses:

Inventor
Peter F. Pütz
by William F. Hall
his atty.

UNITED STATES PATENT OFFICE.

PETER FERDINAND PÜTZ, OF CASSEL, GERMANY.

TELESCOPE WITH PRISMS.

No. 844,186.      Specification of Letters Patent.      Patented Feb. 12, 1907.

Application filed October 15, 1906. Serial No. 338,995.

*To all whom it may concern:*

Be it known that I, PETER FERDINAND PÜTZ, a subject of the Emperor of Germany, residing at Cassel, in the Kingdom of Prussia and Province of Hesse-Nassau, Germany, have invented certain new and useful Improvements in Telescopes with Prisms, of which the following is a specification.

My invention relates to improvements in telescopes with prisms, whereby the construction of the telescope is rendered simple and compact and its manufacture is cheapened and also the adjustment of the prisms is rendered easy and simple. The so-improved telescope presents the advantage that it produces images of greater lucidity and precision than known telescopes of which I am aware, since the path of the rays of light through the prisms is shortened. The objects of my improvement are, first, to make the casing for the prisms cylindrical; second, to provide within the cylindrical casing two modified Nachet's prisms of improved construction placed side by side; third, to connect the cylindrical casing with the objective, on the one hand, and with the eyepiece, on the other hand, by means of screw-threads, the objective and the eyepiece being placed with their axes in the same central longitudinal plane of the cylindrical casing and parallel, and symmetrically to the axis of the longitudinal latter, and, fourth, to provide improved means for adjusting the two prisms in a direction at right angles to the axis of the cylindrical casing. I attain these objects by the construction illustrated in the accompanying drawings, in which—

Figure 1:
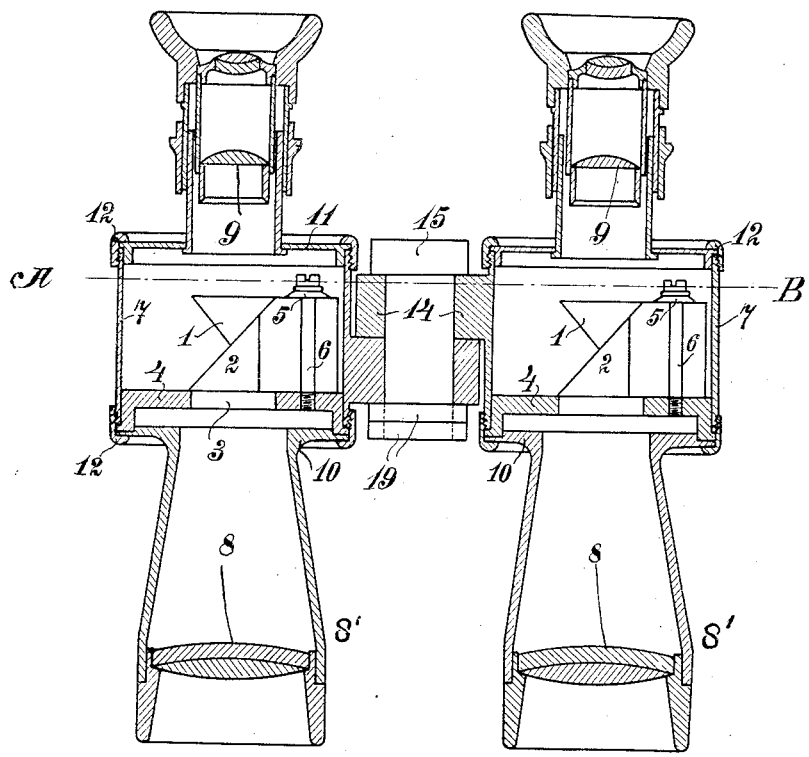
Figure 2:
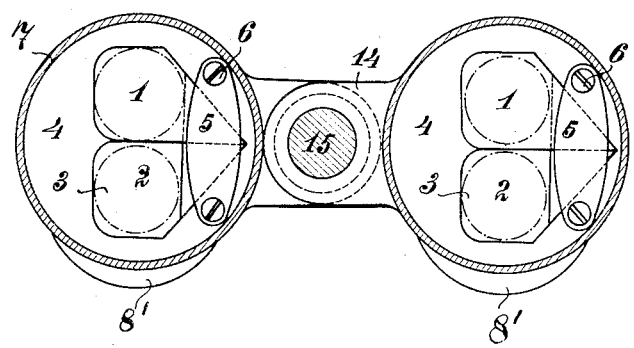

Figure 1 is a central longitudinal section through a binocular telescope constructed in accordance with my invention, the two prisms in each telescope being shown in elevation. Fig. 2 is a cross-section through the same on the line A B in Fig. 1, and Figs. 3 to 6 illustrate the manner in which a Nachet's prism is modified in accordance with my invention.

Similar characters of reference refer to similar parts throughout the several views.

Figure 3:
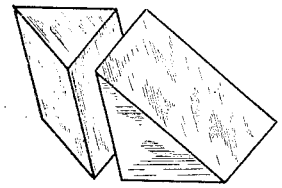
Figure 4:
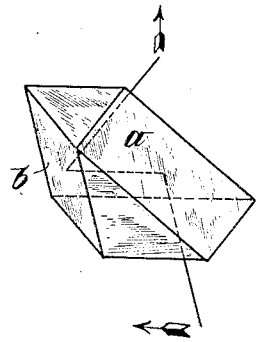
Figure 5:
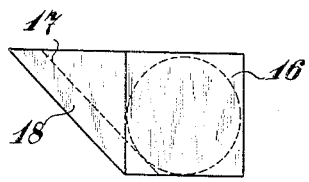

Fig. 4 shows a Nachet's prism which may be assumed to be formed by combining two prisms shown in Fig. 3, the cross-sections of which are rectangular isosceles triangles and the sides of which contiguous to their right-angled corners are square. The path of a ray of light through the Nachet's prism shown in Fig. 4 is indicated by the broken line, the ray entering the prism, say, through the bottom face at right angles thereto, then being doubly deflected, first by the face $a$ and next by the face $b$, after which it leaves the prism through the rear face at right angles thereto and in a direction at right angles to that of the incident ray. Thereby the image is turned through an angle of ninety degrees, as is indicated by the two arrows in Fig. 4. Fig. 5 is a plan of this Nachet's prism.

Figure 6:
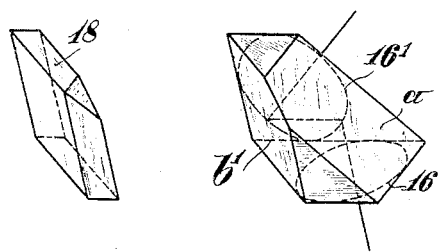

The Nachet's prism is according to my invention modified in the manner that a piece 18 (shown on the left in Fig. 6) is cut off in a plane 17, which is parallel to the face $b$ in Fig. 4 and passes through the tangent to a circle 16, inscribed in the square shown in Fig. 5. Thereby, of course, the path of a ray from the center of the face $a$ to that of the face $b$ is shortened, so that the lucidity of the image produced will be larger than before. The ray deflected from the new face $b'$ will pass through the center of a circle $16'$, which is inscribed in the rear face, as is illustrated in Fig. 6, where on the right a perspective view of the modified Nachet's prism is shown. These two inscribed circles 16 and $16'$ prove that the size of the image is not in the least reduced by the said modification of the original prism. It will be evident that the new prism so formed will require less space than the Nachet's prism, so that it is possible to place two of these new prisms 1 and 2 side by side within a smaller circle than before. (See Fig. 2.)

Figs. 1 and 2 illustrate a binocular telescope according to my invention. It consists of two telescopes, and each telescope comprises a short cylindrical casing 7, a circular plate 4, a bottom 10, with an objective 8, a cover 11, with an eyepiece 9, and two internally-screw-threaded rings 12 12. The latter fit to corresponding external screw-threads at both ends of the cylindrical casing 7 and serve as nuts for connecting the objective glass 8 and its tube or barrel $8'$ and the eyepiece 9 with the cylindrical casing 7 by means of the bottom 10 and the cover 11, respectively. The constructions of both the eyepiece 9 and the objective 8 are immaterial to my invention. The circular plate 4 is provided with an eccentric circular aperture 3, the center of which coincides with that of the inscribed circle 16 in Fig. 6. The two prisms 1 and 2 are made exactly alike and are so placed side by side that the bottom face of the prism 1 is turned upward, so that the two inscribed circles 16' 16' of the two prisms will coincide with each other. The objective glass 8 will require to be placed with its axis parallel to the axis of the cylindrical casing 7, so that its longitudinal axis passes through the center of the round aperture 3. The eyepiece 9 is placed in the same central longitudinal plane of the cylindrical casing 7 as the objective 8 and parallel to the axis of the casing 7, the axis of said eyepiece passing through the center of the inscribed circle 16 of the prism 1. Of course the distance between the axis of the casing 7 and that of the objective 8 will be like the distance between the former and the axis of the eyepiece. The two prisms 1 and 2 are secured on the cicular plate 4 by means of a bridge 5 and two adjusting-screws 6 6. Thereby it is rendered possible to adjust the two prisms in a simple manner, since the incident ray of light will enter the prism 2 in the same plane in which the emerging ray of light passes from the prism 1 to the eyepiece. The two telescopes are shown as combined to form a binocular telescope. Their cylindrical casings 7 7 are provided with lugs 14 14, which are pivotally connected by means of a bolt 15 and two nuts 19 19. Obviously the two telescopes may be combined in any other known manner. Of course either telescope may be combined with any other optical instrument in any known manner.

From the drawings it will be seen that the diameter of the cylindrical casing 7 can be made moderate and that its space is better utilized than if other known prisms were to be employed. Thereby the weight of the telescope is in proportion reduced, so that this instrument is rendered handy, the more so since the cylindrical casing 7 is made short. The internally-screw-threaded rings 12 12 for combining the parts of the telescope can be easily produced and adjusted. They also render the putting together of the parts easier than if a plurality of screws were to be made and used, as in other known instruments. Therefore the manufacture of the improved telescope is cheapened.

For the binocular telescope it is a decided advantage that the two pairs of prisms 1 and 2 can be disposed in the same manner in both telescopes and that for equalizing similar defects of the prisms, as to polish or the like, the two pairs of prisms can be shifted in the same direction. Thereby the adjustment of the prisms is facilitated.

The telescope can be taken to pieces easily for inspection or cleaning, even by unskilled people.

The telescope may be varied in many respects without departing from the spirit of my invention.

I claim—

1. In a telescope, the combination with a cylindrical casing provided with screw-threads at both ends, of a cover with an eccentric eyepiece, a bottom with an eccentric objective, two internally-screw-threaded rings for fastening said cover and said bottom on the screw-threads of said cylindrical casing, said eyepiece and said objective being placed with their axes in the same central longitudinal plane of said cylindrical casing and parallelly and symmetrically to its axis, a frame in said cylindrical casing, two like Nachet's prisms placed side by side on said frame and so that a ray of light passing from the objective to one prism be twice deflected in each prism and be allowed to pass from the second prism to the eyepiece, and means for adjusting said two prisms in a direction at right angles to the axis of said cylindrical casing.

2. In a telescope, the combination with a cylindrical casing provided with screw-threads at both ends, of a cover with an eccentric eyepiece, a bottom with an eccentric objective, two internally-screw-threaded rings for fastening said cover and said bottom on the screw-threads of said cylindrical casing, said eyepiece and said objective being placed with their axes in the same central longitudinal plane of said cylindrical casing and parallelly and symmetrically to its axis, a plate inserted between said bottom and the edge of said cylindrical casing and provided with a round aperture in the axis of said objective, two like Nachet's prisms placed side by side on said plate and so that a ray of light passing from the objective to one prism be twice deflected in each prism and be allowed to pass from the second prism to the eyepiece, a bridge bearing on said two prisms, and two adjusting-screws for connecting said plate with said bridge.

3. In a telescope, the combination of two substantially similar Nachet's prisms placed side by side on a plane at right angles to the longitudinal axis of the telescope, their inclined faces parallel to the telescope-axis forming a right angle, the adjacent parallel faces of said prisms being in surface contact and the non-adjacent corresponding parallel faces being directed one toward the objective and the other toward the eyepiece.

4. In a telescope, the combination with a cylindrical prism-casing, of an eyepiece and an objective both placed with their axis in in the same central longitudinal plane of said cylindrical prism-casing and parallelly and symmetrically to its axis, a frame in said cylindrical prism-casing at right angles to its axis, two like Nachet's prisms placed side by side on said frame, their inclined faces parallel to the longitudinal axis of the casing forming a right-angled corner and the adjacent parallel faces of said prisms being in surface contact and the non-adjacent corresponding parallel faces being directed one toward the eyepiece and the other toward the objective, and means for adjusting said two prisms on said frame.

5. In a telescope, the combination with a cylindrical prism-casing provided with screw-threads at both ends, of a cover with an eccentric eyepiece, a bottom with an eccentric objective, two internally-screw-threaded rings for fastening said cover and said bottom on the screw-threads of said cylindrical casing, said eyepiece and said objective being placed with their axes in the same central longitudinal plane of said cylindrical prism-casing and parallelly and symmetrically to its axis, a frame in said cylindrical prism-casing at right angles to its axis, two like Nachet's prisms placed side by side on said frame, their inclined faces parallel to the longitudinal axis of the casing forming a right-angled corner and the adjacent parallel faces of said prisms being in surface contact and the non-adjacent corresponding parallel faces being directed one toward the eyepiece and the other toward the objective, and means for adjusting said two prisms on said frame.

6. In a telescope, the combination with a cylindrical prism-casing provided with screw-threads at both ends, of a cover with an eccentric eyepiece, a bottom with an eccentric objective, two internally-screw-threaded rings for fastening said cover and said bottom on the screw-threads of said cylindrical prism-casing, said eyepiece and said objective being placed with their axis in the same central longitudinal plane of said cylindrical casing and parallelly and symmetrically to its axis, a plate inserted between said bottom and the edge of said cylindrical prism-casing and provided with a round aperture in the axis of said objective, two like Nachet's prisms placed side by side on said plate, their inclined faces parallel to the longitudinal axis of the casing forming a right-angled corner and the adjacent parallel faces of said prisms being in surface contact and the non-adjacent corresponding parallel faces being directed one toward the eyepiece and the other toward the objective, a bridge bearing on said two prisms, and two adjusting-screws for connecting said plate with said bridge.

7. In a binocular telescope, the combination with two cylindrical prism-casings parallel to each other, of means for combining said two cylindrical prism-casings, two eyepieces and two objectives placed with their axes in the same central longitudinal planes of said two cylindrical prism-casings and parallelly and symmetrically to their axes, two frames in said two cylindrical prism-casings at right angles to their axes, two pairs of like Nachet's prisms on said two frames, the prisms of each pair being placed side by side in the same direction in each prism-casing, so that their inclined faces parallel to the axis of the casing form a right-angled corner and the adjacent parallel faces of said prisms being in surface contact and the non-adjacent corresponding parallel faces being directed one toward the eyepiece and the other toward the objective, and means for adjusting said two pairs of prisms on said two frames.

8. In a binocular telescope, the combination with two cylindrical prism-casings parallel to each other and each provided with screw-threads at both ends, of means for combining said two cylindrical prism-casings, two covers with two eccentric eyepieces, two bottoms with two eccentric objectives, four internally-screw-threaded rings for fastening said two covers and said two bottoms on the screw-threads of said two cylindrical prism-casings, each eyepiece and each objective being both placed with their axes in the same central longitudinal plane of the respective prism-casing and parallelly and symmetrically to its longitudinal axis, two frames in said two cylindrical prism-casings at right angles to their axes, two pairs of like Nachet's prisms on said two frames, the prisms of each pair being placed with their axes side by side in the same direction in each prism-casing, so that their inclined faces parallel to the axis of the casing form a right-angled corner and the adjacent parallel faces of said prisms being in surface contact and the non-adjacent corresponding parallel faces being directed one toward the eyepiece and the other toward the objective, and means for adjusting said two pairs of prisms on said two frames.

9. In a binocular telescope, the combination with two cylindrical prism-casings parallel to each other and each provided with screw-threads at both ends, of means for combining said two cylindrical prism-casings, two covers with two eccentric eyepieces, two bottoms with two eccentric objectives, four internally-screw-threaded rings for fastening said two covers and said two bottoms on the screw-threads of said two cylindrical prism-casings, each eyepiece and each objective being both placed with their axes in the same central longitudinal plane of the respective prism-casing and parallelly and symmetrically to its axis, two plates inserted between said two bottoms and the edges of said two cylindrical prism-casings and each provided with a round aperture in the axis of the objective, two pairs of like Nachet's prisms on said two plates, the prisms of each pair being placed side by side in the same direction in each prism-casing, so that their inclined faces parallel to the longitudinal axis of the casing form a right-angled corner and the adjacent parallel faces of said prisms being in surface contact and the non-adjacent corresponding parallel faces being directed one toward the eyepiece and the other toward the objective, two bridges bearing on said two pairs of prisms, and four adjusting-screws for connecting said two plates with said two bridges.

In testimony whereof I have signed my name to this specification in the presence of two subscribing witnesses.

PETER FERDINAND PÜTZ.

Witnesses:
ADALBERT LAEBER,
RICH. FRANK.